US011301486B2

(12) United States Patent
Barmentloo et al.

(10) Patent No.: US 11,301,486 B2
(45) Date of Patent: *Apr. 12, 2022

(54) VISUALIZING TIME METRIC DATABASE

(71) Applicant: ServiceNow, Inc., Santa Clara, CA (US)

(72) Inventors: Robert-Jan Barmentloo, Amsterdam (NL); Elliot Monifi, Amsterdam (NL); Benedetto Fiorelli, Amsterdam (NL); Josip Filipovic, Amsterdam (NL); Oriol Arbones, Amsterdam (NL); Lidhvija Boini, Amsterdam (NL)

(73) Assignee: ServiceNow, Inc., Santa Clara, CA (US)

(*) Notice: Subject to any disclaimer, the term of this patent is extended or adjusted under 35 U.S.C. 154(b) by 91 days.

This patent is subject to a terminal disclaimer.

(21) Appl. No.: 16/791,630

(22) Filed: Feb. 14, 2020

(65) Prior Publication Data

US 2020/0285650 A1    Sep. 10, 2020

Related U.S. Application Data

(63) Continuation of application No. 15/815,498, filed on Nov. 16, 2017, now Pat. No. 10,585,912.

(60) Provisional application No. 62/570,491, filed on Oct. 10, 2017.

(51) Int. Cl.
| | |
|---|---|
| *G06F 16/26* | (2019.01) |
| *G06F 16/28* | (2019.01) |
| *G06F 16/22* | (2019.01) |
| *G06F 3/04847* | (2022.01) |
| *G06F 3/0482* | (2013.01) |

(52) U.S. Cl.
CPC ............ *G06F 16/26* (2019.01); *G06F 3/0482* (2013.01); *G06F 3/04847* (2013.01); *G06F 16/2282* (2019.01); *G06F 16/287* (2019.01)

(58) Field of Classification Search
CPC .... G06F 16/26; G06F 16/287; G06F 16/2282; G06F 3/0482; G06F 3/04847
USPC ........................................................ 707/738
See application file for complete search history.

(56) References Cited

U.S. PATENT DOCUMENTS

| | | | |
|---|---|---|---|
| 5,787,414 | A | 7/1998 | Miike et al. |
| 6,321,229 | B1 | 11/2001 | Goldman |
| 6,609,122 | B1 | 8/2003 | Ensor |
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,062,683 | B2 | 6/2006 | Warpenburg |
| 7,131,037 | B1 | 10/2006 | LeFaive |

(Continued)

*Primary Examiner* — Cam Linh T Nguyen
(74) *Attorney, Agent, or Firm* — Fletcher Yoder PC

(57) ABSTRACT

Disclose herein are applications and platforms for streamlined production of charts and reports from databases containing time series datasets and/or timestamped data. The applications described herein may employ dynamically retrieve data from data centers to quickly provide options to the user. The platform further allows configuration of the charts and/or reports by providing lists of metrics that may be available in the selected data, and lists of transforms that may be applied to the data. The application may employ dynamic user interfaces, which provide processing of the received time series datasets in a data agnostic manner. As a result, the systems and methods described herein may allow generating charts and reports using a streamlined workflow.

20 Claims, 7 Drawing Sheets

(56) References Cited

U.S. PATENT DOCUMENTS

| | | |
|---|---|---|
| 7,170,864 B2 | 1/2007 | Matharu |
| 7,350,209 B2 | 3/2008 | Shum |
| 7,392,300 B2 | 6/2008 | Anantharangachar |
| 7,610,512 B2 | 10/2009 | Gerber |
| 7,617,073 B2 | 11/2009 | Trinon |
| 7,685,167 B2 | 3/2010 | Mueller |
| 7,689,628 B2 | 3/2010 | Garg |
| 7,716,363 B1 | 5/2010 | Golovinsky |
| 7,769,718 B2 | 8/2010 | Murley |
| 7,890,802 B2 | 2/2011 | Gerber |
| 7,925,981 B2 | 4/2011 | Pourheidari |
| 7,930,396 B2 | 4/2011 | Trinon |
| 7,933,927 B2 | 4/2011 | Dee |
| 7,941,742 B1 | 5/2011 | Hao et al. |
| 7,945,860 B2 | 5/2011 | Vambenepe |
| 8,051,164 B2 | 11/2011 | Peuter |
| 8,082,222 B2 | 12/2011 | Rangarajan |
| 8,224,683 B2 | 7/2012 | Manos |
| 8,266,096 B2 | 9/2012 | Navarrete |
| 8,380,645 B2 | 2/2013 | Kowalski |
| 8,402,127 B2 | 3/2013 | Solin |
| 8,457,928 B2 | 6/2013 | Dang |
| 8,478,569 B2 | 7/2013 | Scarpelli |
| 8,554,750 B2 | 10/2013 | Rangaranjan |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,868,486 B2 | 10/2014 | Tamayo |
| 8,887,133 B2 | 11/2014 | Behnia |
| 9,015,188 B2 | 4/2015 | Behne |
| 9,037,536 B2 | 5/2015 | Vos |
| 9,098,322 B2 | 8/2015 | Apte |
| 9,128,965 B1 | 9/2015 | Yanacek et al. |
| 9,137,115 B2 | 9/2015 | Mayfield |
| 9,239,857 B2 | 1/2016 | Trinon |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,535,737 B2 | 1/2017 | Joy |
| 9,613,070 B2 | 4/2017 | Kumar |
| 9,645,833 B2 | 5/2017 | Mueller |
| 9,654,473 B2 | 5/2017 | Miller |
| 9,659,051 B2 | 5/2017 | Hutchins |
| 9,766,935 B2 | 9/2017 | Kelkar |
| 9,792,387 B2 | 10/2017 | George |
| 9,805,322 B2 | 10/2017 | Kelkar |
| 9,819,729 B2 | 11/2017 | Moon |
| 9,852,165 B2 | 12/2017 | Morozov |
| 10,002,203 B2 | 6/2018 | George |
| 10,324,609 B2 | 6/2019 | Sanches et al. |
| 2014/0282053 A1 | 9/2014 | Hauschild et al. |
| 2015/0262396 A1 | 9/2015 | Devarajan et al. |
| 2016/0009251 A1 | 3/2016 | Poola et al. |
| 2017/0132300 A1 | 5/2017 | Sekar |

VISUALIZING TIME METRIC DATABASE

CROSS-REFERENCE TO RELATED APPLICATIONS

This application is a continuation application of U.S. patent application Ser. No. 15/815,498, filed Nov. 16, 2017, which claims priority from and the benefit of U.S. Provisional Application Ser. No. 62/570,491, entitled "Visualizing Time Metric Database", filed Oct. 10, 2017, both of which are hereby incorporated by reference in their entirety for all purposes.

BACKGROUND

The present disclosure relates generally to systems and methods for managing and visualizing databases. More specifically, the present disclosure is related to systems and methods that provide interactive generation of visual reports from databases including time series data.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Certain organizations may employ computer resources to obtain information from events or measurements collected over a period of time. The collected data may include multiple time series datasets that may be stored in a repository, such as local database, a distributed database, a remote data centers, a cloud computing storage environment, or any other type of suitable storage. Due to the ability to continuously collect data regarding events and measurements, the collected data may include a number of time series datasets, such that each time series dataset may include a number of timestamped entries. Such type of data may be particularly difficult to analyze due to its volume of data points or samples and, as a result, information from time metric database may not be useful in its raw form. As such, analysis of the time series datasets may be employed for obtaining charts and/or reports that provide discernible information from the collected data. However, these analyses may be cumbersome due to the lack of tools geared towards analysis of databases including time series datasets.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Methods and systems described herein are related to platforms and applications that may create reports or charts from time series datasets, in a streamlined manner. To that end, the systems may integrate many processes into a single platform and tool that may inspect the database or the data sources and provide a list of available information. The applications may, for example, allow grouping of multiple time series datasets based on a metric or metadata associated with the metric. The applications may also provide the user with a series of options related to mathematical operations or other processing operations that can be applied to the datasets. The applications described herein may employ a dynamic user interface for selecting the database or datasets, and to configure the charts and/or reports. The ability to use the dynamic user interface increases the speed of generation of reports, and may enable automated production of charts and/or reports.

In a first embodiment, a system may have a non-transitory memory coupled to a plurality of processors. The processors may execute instructions from the memory for retrieving tables from a data source. The tables may include grouped metrics, such that each metric may have multiple time series datasets. The processor may also display a list of the tables via an electronic display, and receive a selection of a table from a user via an input device. Upon receiving the selection, the processor may dynamically display visualization templates, grouped metrics that may be in the table, and transform operations for analyzing data. The processor may receive selections from the user related to a grouped metric, a transform operation, and/or a visualization template via the input device. Based on the selections, the processor may generate a time series chart, and display the chart via the electronic display.

In another embodiment, another system may have a non-transitory memory and multiple processors. The processors may be coupled to a datacenter, and may perform instructions stored in the memory. The processor may receive a selection of a data source from a client device via an input device. In response, the processor may retrieve tables from the selected data source based on the selection. The tables may include grouped metrics and each metric of the grouped metrics may have multiple time series datasets. The processors may provide the table names to the client device and may receive a selection of a table. Upon receiving the selection of the table via the input device, the processor may dynamically provide visualization templates, grouped metrics that may be in the table, and transform operations as determined from the type of data contained in the table to the client device. The processor may receive selections for a grouped metric, a transform operation, and a visualization template, and may then, in turn, provide a time series chart based on these selections.

In yet another embodiment, a method for dynamic configuration of time charts may include causing a processor of a client device to retrieve a set of tables from a data source in a datacenter. The tables may include grouped metrics and each metric of the grouped metric may have multiple time series datasets. The method may also include causing the processor to display a list of the retrieved tables and for receiving a table selection from a user through an input of the client electronic device. The method may also include dynamically displaying visualization templates, grouped metrics available from the selected tables, and transforms that perform a mathematical operation on the data associated with the metric in the electronic display. Upon receiving selections of the visualization template, the metric, and the transforms via an input device, the method may include providing the client device with the time series chart based on the metric, via the electronic display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
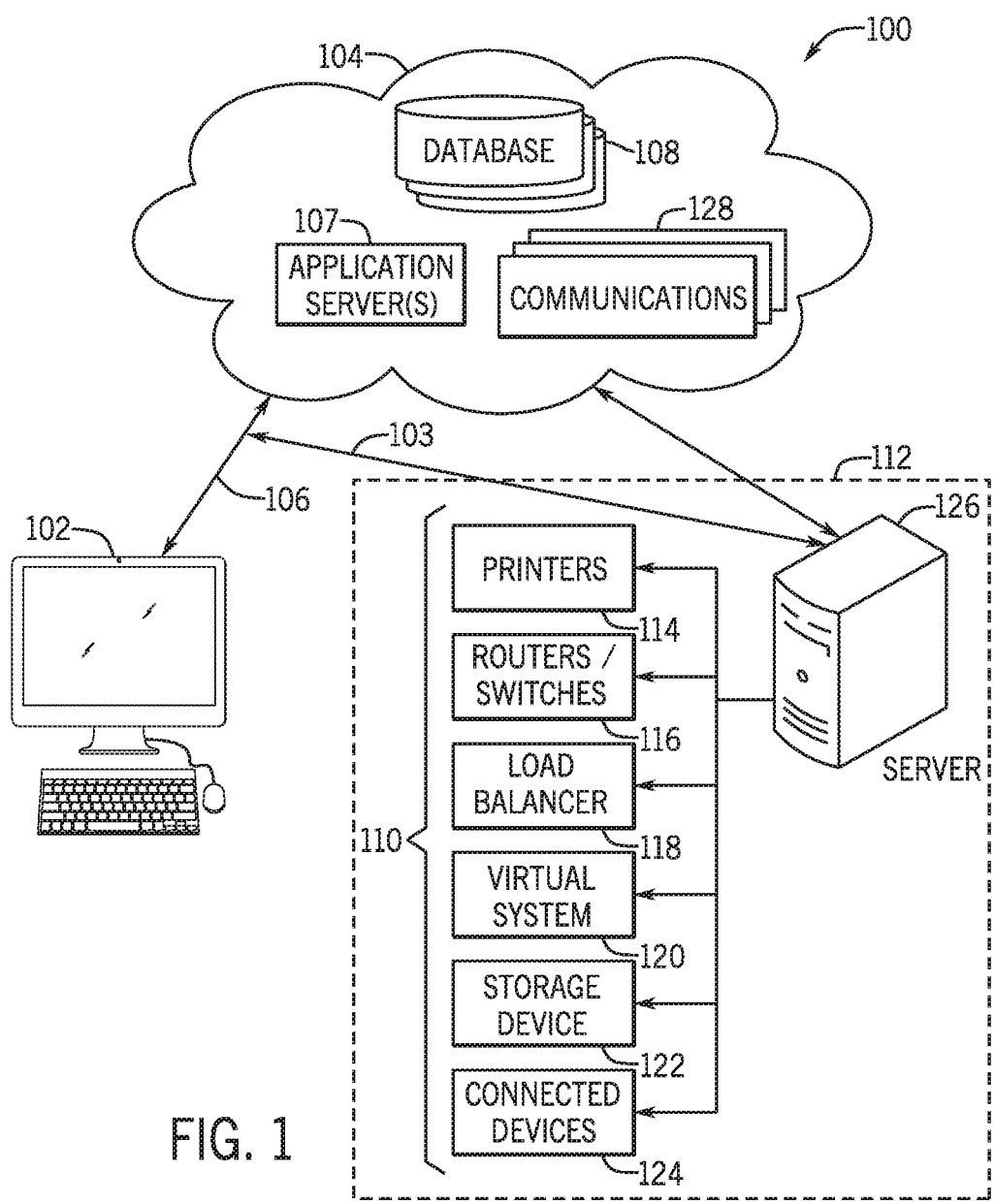
FIG. 1 is a block diagram of a generalized distributed computing system utilizing a platform in the context of a cloud service and may provide storage, visualization, and/or report generation from time series data, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Many enterprises make use of information obtained from time series data to improve management of enterprise resources and/or policies. Examples of time series datasets include weekly sales revenue and sales volumes in stores, or daily fuel consumption and mileage in a fleet of cars. Due to the potential for the large volume of the time-stamped data, certain analyses, such as grouping or subgrouping of datasets, sorting the type of data, selecting a time range, and/or performing mathematical operations, may be performed to reduce data volume and facilitate extraction of actionable information from the raw collected data. Visualization of data in the form of charts may further improve obtaining information and generating automated reports. Performance of these analyses and visualizations may be cumbersome due to the number of different tools that may be employed to accomplish the process. As an example, a user may employ one tool to manage storage, a separate tool for parsing and/or extracting data, a third tool for performing operations, a fourth tool for generating charts, and a fifth tool for producing a report that include the charts. As a further complexity, the diversity of data storage systems and sensing methods may further increase the challenge of obtaining information from time series data. Moreover, time series datasets stored in different formats may use different management and/or data extraction tools.

The fragmentation in the tools for information extraction from time series data may decrease the speed of the production of charts and/or reports from acquired data, resulting in less available actionable information. As an example, a corporation that may have multiple stores may collect daily sales volumes of its available products in the many locations. This collected data may have potential to provide information related to geographical or temporal trends, but that information is not readily available without the creation of charts and/or reports dues to the volume of data points. In the example, automated and/or streamlined generation of charts or reports from the collected time series datasets may allow the corporation to notice a long-term decline, a regional preference, or a seasonable trend for a particular product, and adjust its purchases in an integrated manner.

This disclosure relates to platforms and applications that integrate the many processes involved in obtaining actionable information in an integrated manner. Certain embodiments include systems that receive time series data from diverse data sources, and import the data into an integrated time metric database. Certain embodiments include systems that may retrieve data from a time metric database or other data sources and provide a dynamic user interface (UI) for a user to select data for dynamic chart and/or report generation. The dynamic UI may further allow a user to select analyses routines and data chart types based on the type of data retrieved from the database. As detailed below, the platforms and applications may provide an integrated data process that may be used with a wide variety of time data series. By making use of these platforms and applications, enterprises may increase the amount of actionable information obtained from the stored time series data.

With the preceding in mind, and by way of introduction, FIG. 1 is a block diagram of a system 100 that utilizes a distributed computing framework, which may be used to implement one or more of the platforms and/or applications described herein. As illustrated in FIG. 1, a client 102 communicates with a platform, such as a cloud service 104, over a communication channel 106. The client 102 may include any suitable computing system. For instance, the client 102 may include one or more computing devices, such as a mobile phone, a tablet computer, a laptop computer, a notebook computer, a desktop computer, a wearable device, a telemetry system, or any other suitable computing device or combination of computing devices. The client 102 may include client application programs running on the computing devices. The client 102 may include sensors or systems capable of generating timed or time-stamped data. The client 102 can be implemented using a single physical unit or a combination of physical units (e.g., distributed computing) running one or more sensor or client application programs. Furthermore, in some embodiments, a single physical unit (e.g., server) may run multiple client application programs simultaneously.

The platform 104 may include any suitable number of computing devices (e.g., computers) in one or more locations that are connected together using one or more networks. For instance, the platform 104 may include various computers acting as servers in datacenters at one or more geographic locations where the computers communicate using network and/or Internet connections. The communication channel 106 may include any suitable communication mechanism for electronic communication between the client 102 and the platform 104. The communication channel 106 may incorporate local area networks (LANs), wide area networks (WANs), virtual private networks (VPNs), cellular networks (e.g., long term evolution networks), and/or other network types for transferring data between the client 102 and the platform 104. For example, the communication channel 106 may include an Internet connection when the client 102 is not on a local network common with the platform 104. Additionally, or alternatively, the communication channel 106 may include network connection sections when the client and the platform 104 are on different networks or entirely using network connections when the client 102 and the platform 104 share a common network. Although only a single client 102 is shown connected to the platform 104, it should be noted that the platform 104 may connect to multiple clients (e.g., tens, hundreds, or thousands of clients).

Through the platform 104, the client 102 may connect to various devices with various functionality, such as gateways, routers, load balancers, databases, application servers running application programs on one or more nodes, or other devices that may be accessed via the platform 104. For example, the client 102 may connect to an application server 107 and/or one or more databases 108 via the platform 104. The application server 107 may include any computing system, such as a desktop computer, laptop computer, server computer, and/or any other computing device capable of providing functionality from an application program to the client 102. The application server 107 may include one or more application nodes running applications such as the time series configuration and report generation system described herein, whose functionality is provided to the client locally or via the platform 104. The application nodes may be implemented using processing threads, virtual machine instantiations, or other computing features of the application server 107. Moreover, the application nodes may store, evaluate, or retrieve data, such as time series data, from the databases 108 and/or a database server.

The databases 108 may be arranged as a part of a network 112, which may have additional assets and services 110, which may include computers and/or other devices on the network 112 (or group of networks) separate from or contiguous with the cloud service 104 resources. Network 112 may include a gateway server 126 that may provide access via a communication channel 103 between the network 112, the client 102, and the platform 104. Through the gateway server 126, the platform 104 or the client 102 may access to the assets and services 110 in the network 112, such as printers 114, routers and/or switches 116, load balancers 118, virtual system 120, storage device 122, and/or connected devices 124. As such, the assets and services 110 may include a combination of physical resources or virtual resources. The virtual resources and/or the other connected devices may operate application for time series data retrieval, visualization, and report generation using a dynamic application in the client 102.

A database 108 that is a part of the network 112 may contain a series of tables containing time series data (e.g., time series datasets) which may be stored in a storage device 120. The time series datasets may be collected by the client 102 or by a connected device 124. An application, which may operate in a processor of the server 126, or in the virtual system 120, may collect the data and store in the tables of the database. The application may also add a timestamp and/or metadata which may include a data source and/or a metric type. The metadata may be used for grouping when generating charts and reports, as detailed below. The datasets may be also received from through the cloud service 104 from another device as files or external databases, and may be imported into database 108.

Although the system 100 is described as having the application servers 107, the databases 108, the gateway server 126, and the like, it should be noted that the embodiments disclosed herein are not limited to the components described as being part of the system 100. Indeed, the components depicted in FIG. 1 are merely provided as example components and the system 100 should not be limited to the components described herein. Instead, it should be noted that other types of server systems may implement the knowledge applications, the knowledge databases, and the search systems described herein. Further, it should be noted that server systems described herein may communicate with each other via a number of suitable communication protocols, such as via wired communication networks, wireless communication networks, and the like. In the same manner, the client 102 may communicate with a number of server systems via a suitable communication network without interfacing its communication via the platform 104.

Figure 2:
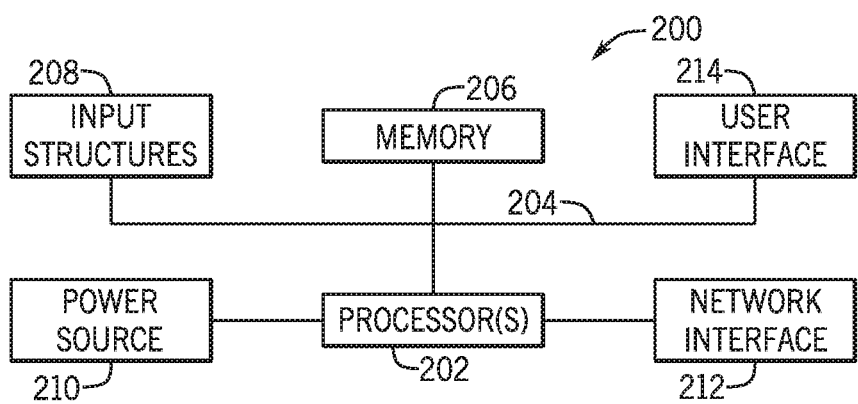
FIG. 2 is a block diagram of a computing device utilized in the distributed computing system of FIG. 1, in accordance with an embodiment.

In any case, to perform one or more of the operations described herein, the client 102, the application server 107, the gateway server 126, and other server or computing system described herein may include one or more of the computer components depicted in FIG. 2. FIG. 2 generally illustrates a block diagram of example components of a computing device 200 and their potential interconnections or communication paths, such as along one or more busses. As briefly mentioned above, the computing device 200 may be an embodiment of the client 102, the application server 107, a database 108, other servers or processor-based hardware devices present in the platform 104, a device running the gateway server 126, and/or any of the assets and services 110. As previously noted, these devices may include a computing system that includes multiple computing devices and/or a single computing device, such as a mobile phone, a tablet computer, a laptop computer, a notebook computer, a desktop computer, a server computer, and/or other suitable computing devices.

As illustrated, the computing device 200 may include various hardware components. For example, the device includes one or more processors 202, one or more busses 204, memory 206, input structures 208, a power source 210, a network interface 212, a user interface 214, and/or other computer components useful in performing the functions described herein. The one or more processors 202 may include a processor or other circuitry capable of performing instructions stored in the memory 206 or in other accessible resources. For example, the one or more processors 202 may include microprocessors, system on a chip (SoCs), or any other performing functions by executing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206. Moreover, the functions of the one or more processors 202 may be distributed across multiple processors in a single physical device or in multiple processors in more than one physical device. The one or more processors 202 may also include specialized processors, such as a graphics-processing unit (GPU).

The one or more busses 204 include suitable electrical channels to provide data and/or power between the various components of the computing device. For example, the one or more busses 204 may include a power bus from the power source 210 to the various components of the computing device. Additionally, in some embodiments, the one or more busses 204 may include a dedicated bus among the one or more processors 202 and/or the memory 206. The memory 206 may include any tangible, non-transitory, and computer-readable storage media. For example, the memory 206 may include volatile memory, non-volatile memory, or any combination thereof. For instance, the memory 206 may include read-only memory (ROM), randomly accessible memory (RAM), disk drives, solid-state drives, external flash memory, or any combination thereof. Although shown as a single block in FIG. 2, the memory 206 can be implemented using multiple physical units in one or more physical locations. The one or more processors 202 access data in the memory 206 via the one or more busses 204.

The input structures 208 provide structures acquire data or allow input of data and/or commands to the one or more processors 202. For example, the input structures 208 include a positional input device, such as a mouse, touchpad, touchscreen, and/or the like. The input structures 208 may also include a manual input, such as a keyboard and the like. Positional input devices or manual input devices may allow collection of time data via user interaction. The input structures 208 may also include sensors for autonomous collection of time data related with user and/or environment around computing device 200, such as health monitors, global positioning system (GPS) location device, thermometers, accelerometers, gyroscopes, and other devices. Input structures may also collect data that to monitor the computing device 200 itself. These input structures 208 may be used to input data and/or commands to the one or more processors 202 via the one or more busses 204.

The power source 210 can be any suitable source for power of the various components of the computing device 200. For example, the power source 210 may include line power and/or a battery source to provide power to the various components of the computing device 200 via the one or more busses 204. The network interface 212 is also coupled to the processor 202 via the one or more busses 204. The network interface 212 includes one or more transceivers capable of communicating with other devices over one or more networks (e.g., the communication channel 106). The network interface may provide a wired network interface, such as Ethernet, or a wireless network interface, such an 802.11, Bluetooth, cellular (e.g., LTE), or other wireless connections. Moreover, the computing device 200 may communicate with other devices via the network interface 212 using one or more network protocols, such as Transmission Control Protocol/Internet Protocol (TCP/IP), power line communication (PLC), Wi-Fi, infrared, and/or other suitable protocols. Network interface 212 may be used to couple the computing device 200 for collection of remote time series data, such as telemetry system. A user interface 214 may include a display that is configured to display images transferred to it from the one or more processors 202. The display may include a liquid crystal display (LCD), a cathode-ray tube (CRT), a light emitting diode (LED) display, an organic light emitting diode display (OLED), or other suitable display. The user interface 214 may be used to provide reports and dynamic UI, such as the ones described herein. In addition, and/or alternative to the display, the user interface 214 may include other devices for interfacing with a user. For example, the user interface 214 may include lights (e.g., LEDs), speakers, and the like.

Figure 3:
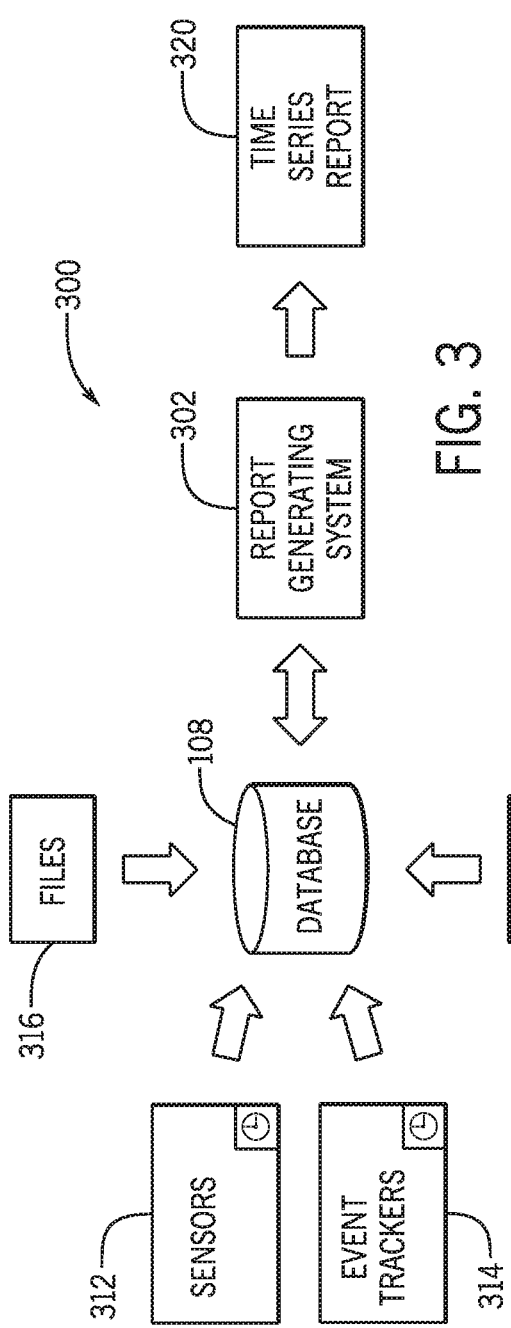
FIG. 3 is a block diagram of a platform that may be used in conjunction with a computing system, such as the computing system of FIG. 1, to provide storage, visualization and/or report generation from time series data, in accordance with an embodiment.

An example of a platform 300 that may be used along with the system 100 to facilitate generation visualization and/or reports from time series data, as discussed herein, is illustrated in FIG. 3. The integrated platform 300 may include a database 108, which may store and/or manage multiple datasets, including time datasets. As discussed above, the database may be located in a local or a remote server, and may be distributed across multiple locations. The database may obtain data from a number of sources, such as sensors 312, event trackers 314, or external files 316.

Sensors 312 may be electronic devices that are capable of collecting physical data. Examples of sensors 312 may include accelerometers, global positioning system (GPS) sensors, gyroscopes, altimeters, electrical detectors, radio frequency identifiers (RFID), hearth rate monitors, step counters, and other electronic devices that may convert physical measurements to digital data. The sensors 312 may have internal clocks and may provide timestamped data directly to the database 108, or may employ an internal clock of a coupled electronic device to create timestamped data related to the physical measurement and to provide the data to the database 108.

Event trackers 314 may be electronic devices that are capable of recording a time of an event, as well as metadata associated to it. Examples of the event trackers 314 include automated telephone log applications in a call center, bank transaction application trackers, stock tickers, and other systems capable of creating time stamped data. The event trackers 314 may store the timestamped data directly in the database 308. The database 108 may also be populated from files 316 or other data sources 318, such as other external databases. Data obtained from files 316 or other data sources 318 may be imported and/or adapted via data filters before being entered in the database 108.

The system 300 may also include a report generating application 302. The report generating application 302 may be capable of retrieving data from the database 108 and, through a dynamic user interface (UI), may allow a user to configure charts and/or reports 320 from time series datasets from any of the variety of sources, in a data agnostic manner. The charts and/or reports 320 generated may include metric-based grouping and/or sorting, and may include transformations (i.e., mathematical operations over data), as detailed below.

Figure 4:
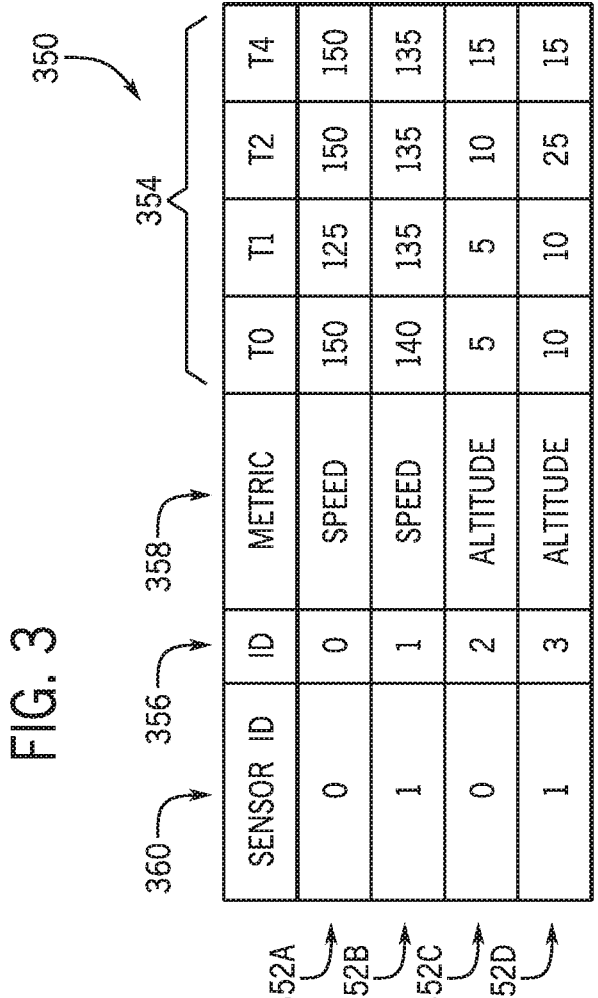
FIG. 4 is an illustrative diagram of an example of time series data that may be used by a platform, such as the platform of FIG. 3, in accordance with an embodiment.

The diagram in FIG. 4 illustrates a table 350 that illustrate time series datasets that may be used to generate charts and/or reports as discussed herein. The table 350 is described to illustrate a possible data structure for a time metric database. Time metric databases include databases that may use metrics to organize time series datasets, which may be used by a report generating application 302. As discussed herein, a metric is a property of a time series dataset that may be used to provide a relationship between the dataset and the type of data measured. It should be appreciated that the data structure illustrated in the table 350 is not the only possible data structure for the data structures in the applications and platforms described, such as system 300 of FIG. 3. In fact, time series datasets or time metric databases may be stored with other data structures, including multi-table relational databases (e.g., structured query language or SQL databases) or non-relational databases (e.g., NoSQL databases), or any other database that may be addressed by employ a metric. Moreover, time datasets that are not arranged in a time metric database, may be filtered and/or imported into a time metric database structure by employing available metadata to determine a metric.

The example table 350 shows 4 different time series datasets 352A, 352B, 352C, and 352D. Each dataset may have multiple time entry records 354, and each record may be associated with a timestamp. Each dataset 352A-D may also have an identifier 356, which may be a unique identifier or a key. As discussed above, time series datasets may be associated with different types of data, as denoted by the metric identifier 358. In the example, time series datasets 352A and 352B are associated with a "SPEED" metric and time series datasets 352C and 352D are associated with an "ALTITUDE" metric. In the example, the time series datasets were obtained from two different sensors, and this information may be stored by a sensor identifier 360. Thus, in the example, time series dataset 352A and 352C provides, respectively, data related to the speed and altitude associated with sensor with identifier 360 "0," and time series datasets 352B and 352D provides, respectively, data related to the speed and altitude associated with sensor identifier 360 "1." Due to this organization of the time series datasets, a report generating application 302 may retrieve datasets as grouped by a metric 358, or a sensor identifier 360. As discussed above, any data structure that may provide access to datasets in the above-described manner may be employed.

Figure 5:
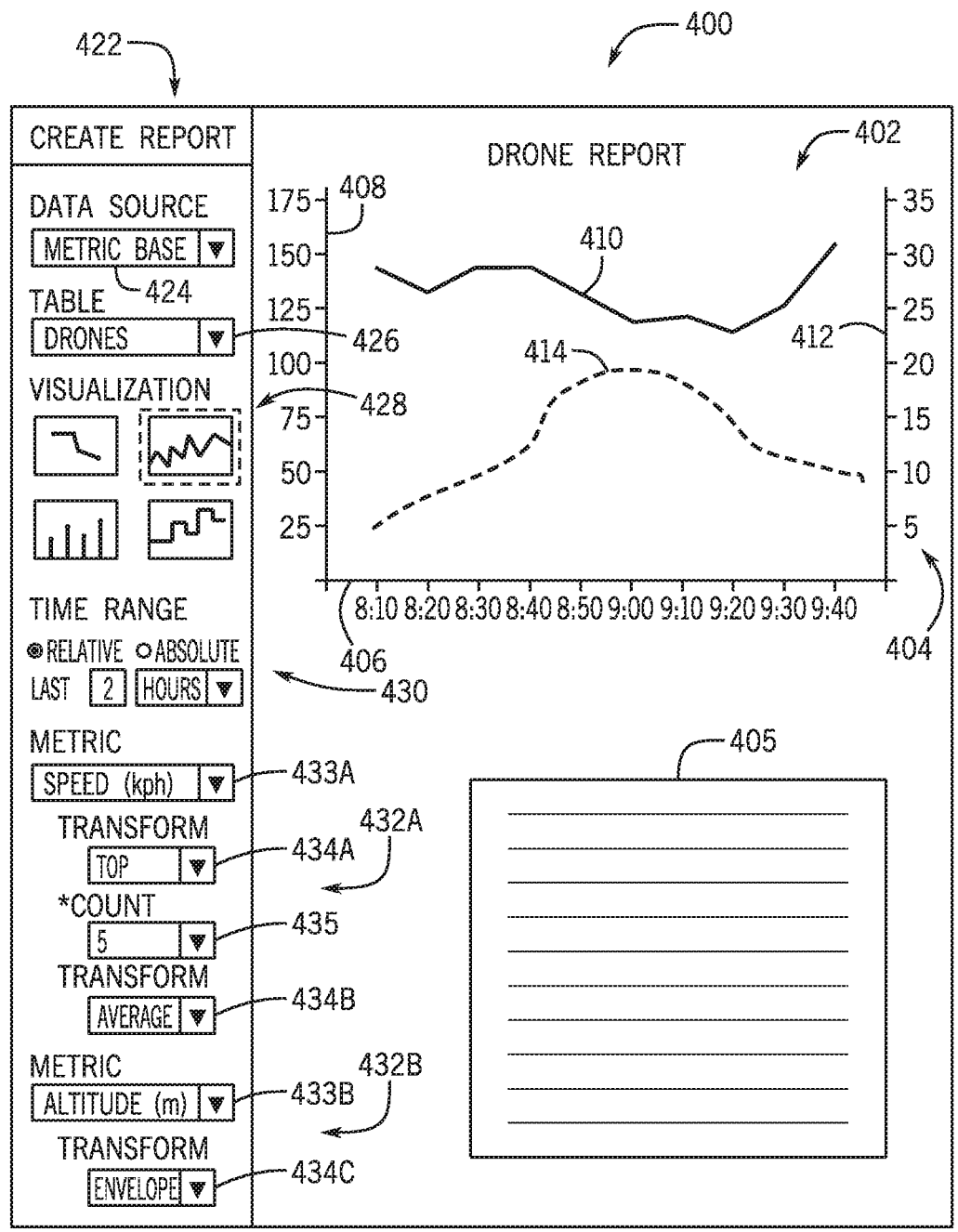
FIG. 5 is a diagram of a dynamic report user interface (UI) that may be used to configure and generate visualization and/or reports from time series data, in accordance with an embodiment.

The diagram in FIG. 5 illustrates an example of a dynamic user interface 400 (UI) that may generate charts and/or reports based on time series datasets in a report generating application 302, such as the one illustrated in FIG. 3. Dynamic user interface 400 may have a report panel 402, which may include a dynamically generated chart 404. Report panel may also include a text section 405. The dynamically generated chart 404 may have a time axis 406, which may be populated by adjustment of a time range 430 during chart configuration, as discussed below. The dynamically generated chart 404 may also include a primary axis 408, which may be populated based on a selected metric, as discussed below. Primary axis 408 may provide reference values for a curve 410 associated with the selected metric. The dynamically generated chart 404 may also include a secondary axis 412, which may be populated based on a second selected metric. The second selected metric may be associated with a second curve 414. Note that, if the range of values covered by curves 410 and 414 are similar, a single axis (e.g., primary axis 408) may be used to provide reference to both curves.

The dynamically generated chart 404 may be configured by a dynamic configuration panel 422. The dynamic configuration panel 422 may dynamically display a series of choices for the time series datasets. The choices may be based on data that was dynamically retrieved or based on user selections via the dynamic configuration panel 422. Examples of dynamic behavior for configuration panel 422 are discussed below, with reference to FIGS. 6A, 6B, 6C, 7A, 7B, 9A, 9B, and 9C. The dynamic configuration panel 422 may enable the user to interact with the dynamically generated chart 404 through UI elements. While the UI elements described herein include combo boxes, selection boxes, radio buttons, and text boxes, it should be understood that other UI elements may be used to provide the dynamic interaction. In the illustrated example, configuration panel 422 may include a data source selection UI element 424, with which a user may select a data source. The selected data source may be, for example, a data source or an imported file. The report generating application 302 may retrieve from the selected data source a list of available tables, which may populate a table selection UI element 426.

After the user selects a table via table selection UI element 426, the report generating application 302 may determine that the selected table includes time series datasets and, as a result, the dynamic configuration panel 422 may display choices associated with production of charts for time series datasets. For example, a visualization selection UI element 428 may provide a selection of types of plots that may be generated in the report panel 402. For example, the charts may include line charts, bar/stick charts, area charts, spline charts, time-step charts, or any chart that may be appropriate for displaying timestamped data. The dynamic configuration panel 422 may provide a time range UI element 430, which may allow a user to select a time range for the chart. This selection may be used to populate time axis 406. In some embodiments of the time range UI element 430, the user may select a relative time range (e.g., a retrospective chart, a time range relative to a specific instant), or an absolute time scale.

If the report generating application 302 determines that the table selected via table selection UI element 426 is part of a time metric database or that it includes multiple metrics, the dynamic configuration panel 422 may provide metric configuration options, such as metric configuration panels 432A and 432B. The metric configuration panel 432A may provide a list of metrics via a metric selection UI element 433A, which may be populated by the report generation application 302 based on the metrics available from the selected table. The metric configuration panels 432A and 432B may also include transform panels, such as transform panels 434A, 434B and 434C. A transform panel 434A may include a list of available transforms (e.g., mathematical operations) that may be applied to the time series dataset. A non-exhaustive list of examples of transforms include Average, Minimize, Maximize, Count, Sum, Log, Median, Standard Deviation, Envelope, Top, Bottom, Add, Subtract, Multiply, Divide, Interpolate, Percentiles, Resample, Filter, and Partition. Note that certain transforms, such as Top, Bottom, Divide, or Resample, may accept additional parameters. If such transform is selected, the transform panel 434A may provide a parameter input UI element 435. For example, upon selection of the Divide transform in a transform panel 434, the parameter input UI element 435 may be displayed to accept the denominator of the Divide transform.

A user may interact with the dynamically generated chart 404 to review the data, through a data drill-down process. Taking the illustrated chart of FIG. 5 as an example, if curve 410 is associated with the metric configured by metric configuration panel 432A (i.e., if curve 410 is an average of the top 5 speeds in the example), a user may click curve 410 and the panel may exhibit additional information related to that data. For example, selecting curve 410 may lead to undoing the latest selected transform, which is the "Average" transform and displaying the top 5 curves in the dynamically generated chart 404. In some systems, selective curve 410 may lead to displaying in text section 405 a table with the data points of curve 410. The specific response that results from interaction with the curve may be programmed by the configuration of drill-down paths. Moreover, the configuration of the drill-down paths may take into account monitoring of UI actions. For example, hovering a cursor over curve 410 may lead to a display of a data point and dynamic changes to text section 405 displaying quantities associated with curve 410, while clicking on curve 410 may lead to a display of a new canvas with the a different data drill-down behavior.

Figure 6C:
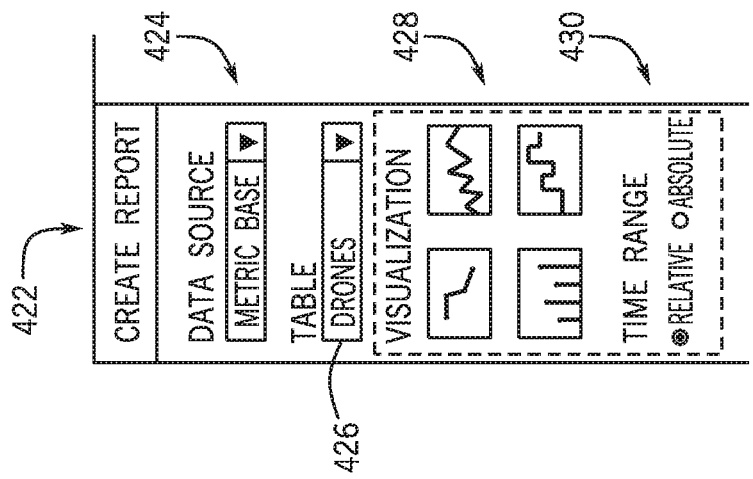
FIG. 6C is a third diagram that illustrates the panel visualization of FIG. 6A, provided by the dynamic report UI, in accordance with an embodiment.
Figure 6B:
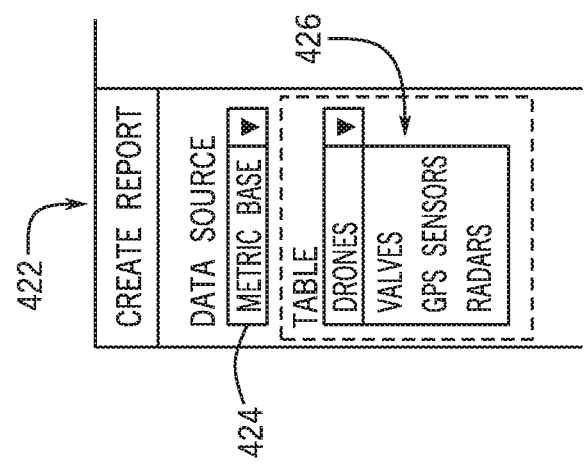
FIG. 6B is a second diagram that illustrates the panel visualization of FIG. 6A, provided by the dynamic report UI of FIG. 5, in accordance with an embodiment.
Figure 6A:
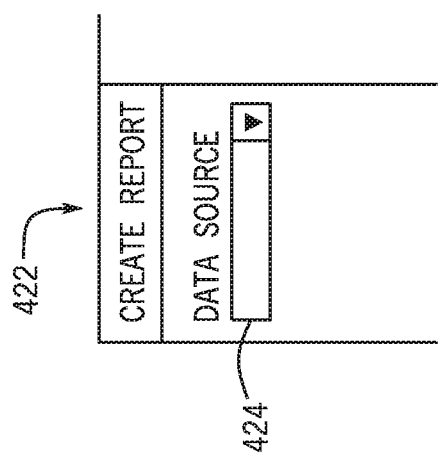
FIG. 6A is a first diagram that illustrates a panel visualization provided by the dynamic report UI of FIG. 5, in accordance with an embodiment.

An example of a dynamic interaction in dynamic configuration panel 422 is illustrated in the series of FIGS. 6A, 6B, and 6C. As a user begins to generate a new report or a new chart within a report using the report generating application 302, the dynamic configuration panel 422 may present a canvas with the data source selection UI element 424, as illustrated in FIG. 6A. As discussed above, the user may select a database, a file, or an import filter containing data for the chart and/or report. The report generating application 302 may inspect the selected data source, and retrieve a list of tables from the data source (e.g., database 108). The application may also create a table selection UI element 426 in the dynamic configuration panel 422 and populate the table selection UI element 426 with the retrieved list of tables, as illustrated in FIG. 6B. After the user selects a table through the table selection UI element 426, the report generating application 302 may inspect the contents of the data in the table. If the selected table contains time series datasets, the dynamic configuration panel 422 may provide a visualization selection UI element 428 that allows the user to easily choose a chart type that can be used to represent or analyze time series data. The dynamic configuration panel 422 may also provide a time range UI element 430 for the user to delimit time boundaries for the generated chart. A dynamic configuration panel 422 showing the visualization selection UI element 428 and the time range UI element 430 in response to a table selection is illustrated in FIG. 6C. Based on the selections in the dynamic configuration panel 422, the report generating application 302 may generate a chart, such as the dynamically generated chart 404, and display it in the report panel 402, as illustrated in FIG. 5. In some embodiments, a user may also change selection in the dynamic configuration panel 422, and may see the selected changes dynamically reflected in the dynamically generated chart 404 automatically.

Figures 7A, 7B:
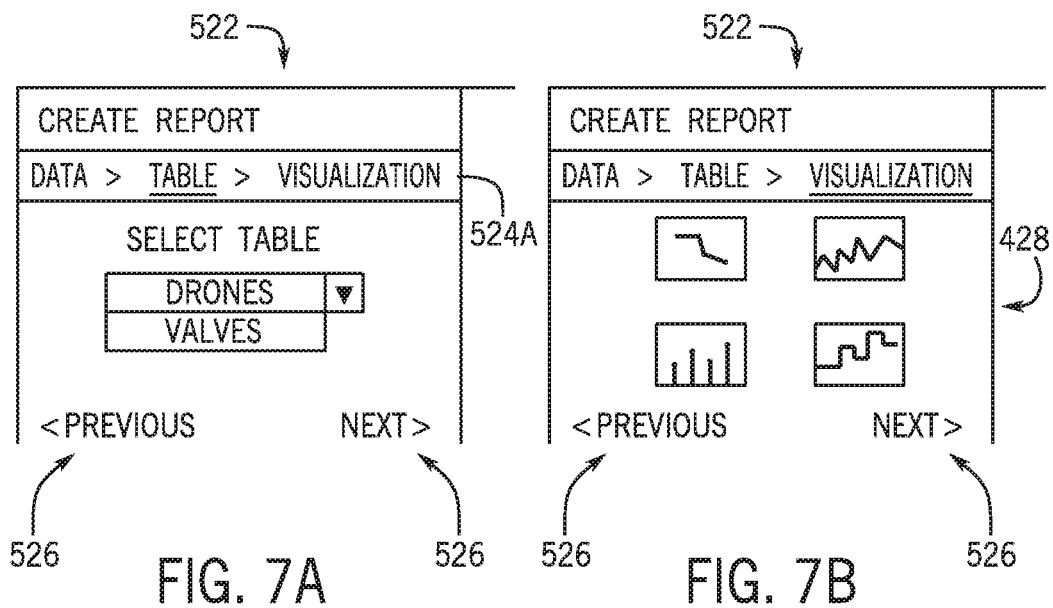
FIG. 7A is a first diagram that illustrates a tabbed panel visualization provided by a dynamic report UI, in accordance with an embodiment.
FIG. 7B is a second diagram that illustrates the tabbed panel visualization of FIG. 7B that may be provided by a dynamic report UI, in accordance with an embodiment.

The examples in FIG. 5 and FIGS. 6A-C illustrate a dynamic configuration panel 422 that may provide a single panel interaction, in which the new elements are added to the panel as the user makes selection. The illustrations in FIGS. 7A and 7B show another example of a dynamic interaction in a dynamic tabbed configuration panel 522, which may be used by the report generating application 302. The tabbed configuration panel 522 may have multiple tabs, with one tab provided for one or few selection UI elements. Navigation in the tabbed configuration panel 522 may be assisted by a navigation UI element 524A, which may employ a breadcrumb navigation interface (i.e., a navigation interface that includes a sequence of available tabs in the tabbed configuration panel 522). Navigation may also be assisted by navigation controllers 526, as illustrated. The illustrated example in FIG. 7A illustrate an interaction in which a user is provided with a table selection UI element 426 in a "Table" tab of the tabbed configuration panel 522, as indicated by navigation UI element 524A. Following the selection, the user may be provided with a visualization selection UI element 428 in a visualization tab of the tabbed configuration panel 522, as indicated by the navigation UI element 524B.

Figure 8:
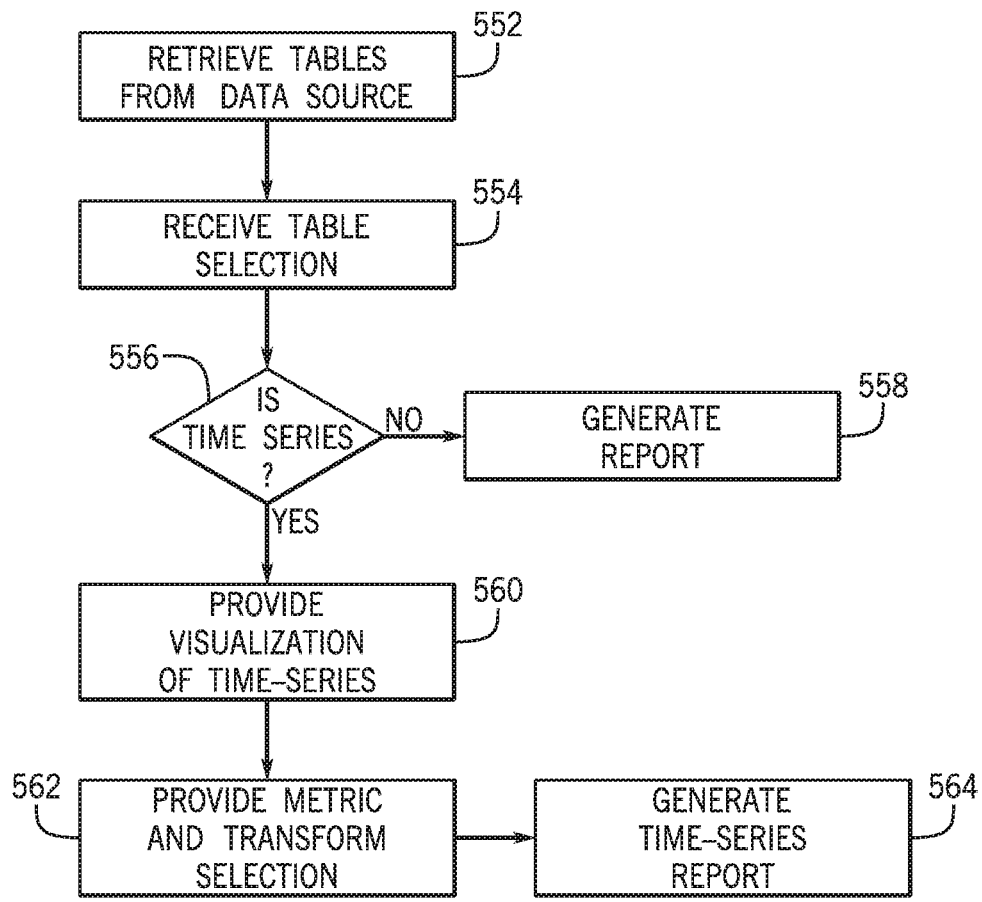
FIG. 8 is a flow chart of a method to generate visualization and/or reports from stored time series data in a platform such as the platform of FIG. 3, in accordance with an embodiment.

The dynamic interactions illustrated in FIGS. 6A-C, 7A, and 7B may be provided by a report generating application 302 performing the method 550 of FIG. 8. Method 550 may have a box 552 for retrieving a list of tables available from a data source, which may have been selected by a user. A box 554 may receive a table selection and parse the data source to inspect the type of data in the data selection. In a decision box 556, the report generating application 302 may determine if the table includes a time metric database (e.g., includes time series datasets and/or if it is organized by metrics). If the data in the table does not include time series datasets, the report generating system 302 may perform the box 558 to generate a report that may be appropriate for the type of data parsed.

If the data in the table includes time series datasets, the report generating system 302 may, through the dynamic interface described above, provide selections related to visualization in box 560. The selections may be related to time ranges and/or type of charts. In a box 562, the report generating system 302 may provide selections for metrics and/or transforms, as detailed below. The selections in box 562 may be used to generate curves associated with one or more metrics that may be available in the selected table. The selections may also allow easy manipulation of the curves based on the use of transforms. Based on the selections made in boxes 554, 560, and/or 562, the report generating system 302 may generate a chart or a report in box 564.

Figure 9C:
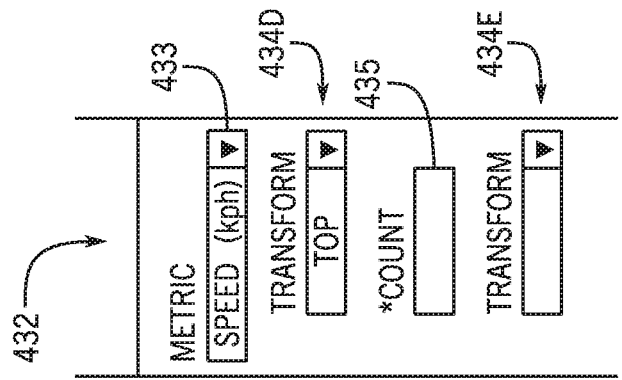
FIG. 9C is a third diagram that illustrates a transform configuration visualization of FIG. 9A that may be provided by a dynamic report UI, in accordance with an embodiment.
Figure 9B:
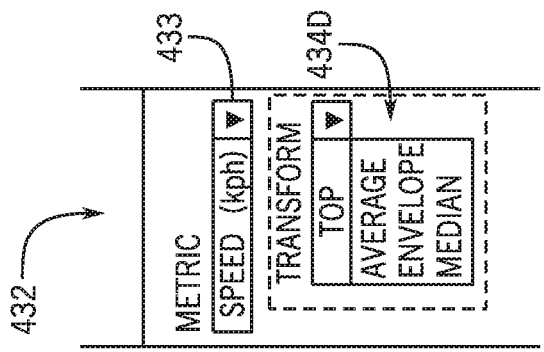
FIG. 9B is a second diagram that illustrates the transform configuration visualization of FIG. 9A that may be provided by a dynamic report UI, in accordance with an embodiment.
Figure 9A:
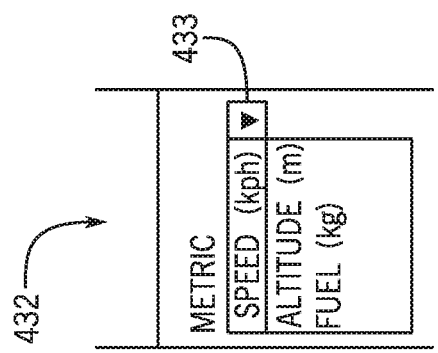
FIG. 9A is a first diagram that illustrates a transform configuration visualization that may be provided by a dynamic report UI, in accordance with an embodiment.

The diagrams in FIGS. 9A-C illustrate a dynamic interaction for selection of metrics and/or transforms, which may be used in a configuration panel such as dynamic configuration panel 422 and/or tabbed configuration panel 522. In FIG. 9A, the user may be provided with a metric selection UI element 433, which includes a list of available metrics in the selected table. After the user performs the selection, the configuration panel may display a transform panel 434D. The transform panel 434D may depict all available transforms and/or a list of transforms that is appropriate for the selected metric. For example, an "Average" transform may be disabled (e.g., hidden) if the selected metric has less than two datasets, while a "Log" transform may be disabled if the selected metric has a non-positive data entry. In response to a transform selection, the configuration panel 434D may follow-up with a parameter input UI element 435 to configure the selected transform. The configuration panel 432 may also provide a second transform panel 434E, which may perform a cascaded transform (i.e., a second transform that may operate on datasets obtained as a result of the transform selected with transform panel 434D). In certain embodiments, the chart may be automatically updated in response to changes to selections in the configuration panel 432.

Figure 10:
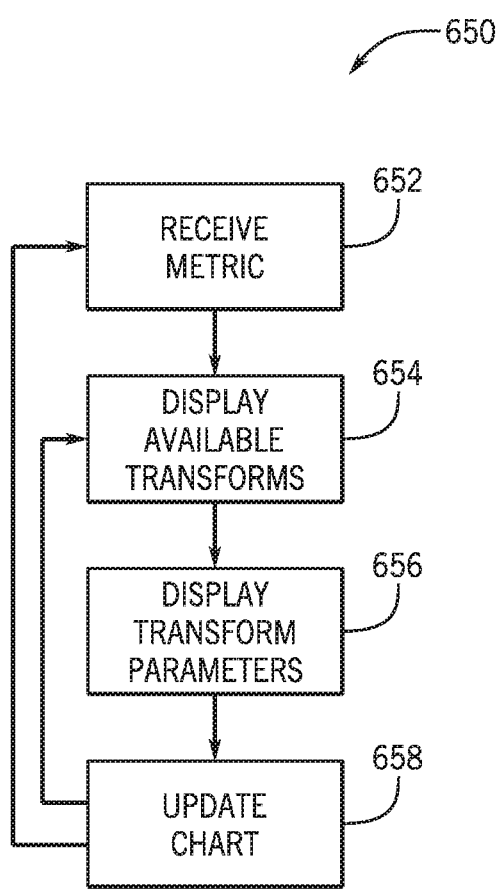
FIG. 10 is a flow chart of a method to configure transforms and/or reports from stored time series data with metrics, in accordance with an embodiment.

The dynamic interaction for configuration of metrics illustrated in FIGS. 9A-C may be provided by a report generating application 302 performing method 650 of FIG. 10. Method 650 may have a box 652 to receive a selection of a metric from a list of metrics that may be in a table. Based on the selected metric, the report generating application 302 may determine a list of appropriate transforms and provide them to the user in a box 654. If a selected transform may be configured by additional parameters, as discussed above, the report generating application 302 may request the parameters via the user interface in box 656. The time chart displaying the datasets as processed by the transforms may be updated in box 658. Moreover, following the chart update, the report generating application 302 may provide the user with a new selection for a metric (box 700), or for an available transform.

As discussed above, the interactions provided by the user interface, such as the dynamic interactions illustrated in FIGS. 6A-C, 7A and 7B, and 9A-C, may include multiple displays and/or panels, which may be associated with steps of the production of the report. During configuration, a user may create a hyperlink (e.g., a URL), which may be associated with a particular panel in the report creation. Thus, if a user stores a hyperlink, that hyperlink may be later used as an entry point to recreate or reconfigure a report without requiring repetition of the initial steps. Moreover, the hyperlink may be shared, allowing a more collaborative production process. As an example, a user that is configuring metric, such as in FIGS. 9A-C, may select a speed metric, but may wish to produce multiple charts, a first one using the "Average" transform, and a second one with the "Median" transform. Such user may generate a hyperlink associated with the panel illustrated in FIG. 9B, and generate a first chart using the "Average" transform. After generating the first chart, the user may enter and/or click the generated hyperlink and be presented with the panel of FIG. 9B without having to repeat previous steps (e.g., steps in FIG. 9A, or in FIGS. 6A-C). The user may also send the hyperlink to other administrators for creation of different panels. The use of hyperlinks during report generation, as described herein, allows a more dynamic and more interactive user experience, as it allows users from leaving and re-entering the report generation system at any point, and allows sharing of the process with other users.

The platform 300 may include, along with report generating system 302 described herein, other tools and/or applications for managing and using performance and analytics reporting. Other application and/or features include, but are not limited to, interfaces for configuration of the platform (e.g., available data sources or other resources available, users and user authorization and roles, etc.), troubleshooting of the system, resource usage monitoring, bug tracking features, alarms and warnings associated with events, and other such features. The platform 300 may allow navigation between the multiple tools by the use of dashboards, which may provide simplified entry points to each application and/or feature. As such, report generating system 302 may have dashboard entries, which may provide entry points for any of the generated reports. The above-described hyperlinks may be used in the dashboard to provide direct access to pre-configured reports. The entries dashboards may be grouped based on the utility of the data. For example, a hyperlink associated with a report chart illustrating the number of bugs reported over time may be displayed next to a bug tracking entry point in the dashboard. Interaction with the dashboard may be flexible and may be used to share data between various users. Furthermore, dashboard entries may be closed, combined, resized, and/or deleted.

The systems and methods described in the present disclosure may be used to facilitate obtaining actionable information from data collected and stored as time series datasets. The systems allow streamlined manipulation of raw time-stamped data that integrates multiple steps, such as importing, collecting, displaying, grouping, and/or performing mathematical operations in a data agnostic manner. As a result, information from not readily available in raw data sources, such may as events and trends, may be identified. The charts and reports may, for example, be used to configured alarms or notifications automatically. In certain embodiments, reports may generate actionable information that may be used to adjust behavior automatically. As an example, if an automated report related to sales may generate a notification related to a long-term drop in sales across an organization. As another example, an automated report may provide information on product stocks, and may automatically create or adjust purchase orders.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   a non-transitory memory; and
   one or more hardware processors configured to execute instructions stored on the non-transitory memory to perform operations, the operations comprising:
   determining a first set of grouped metrics associated with a first table of a set of tables, wherein the first table of the set of tables comprises a set of grouped metrics, and wherein the set of grouped metrics is associated with a plurality of time series datasets;
   displaying, via an electronic display, a plurality of visualization templates and a first input field for selecting one grouped metric of the first set of grouped metrics associated with the first table;
   receiving, via the first input field, a first selection indicative of a first grouped metric of the first set of grouped metrics;
   determining a set of transform operations for the first grouped metric in response to receiving the first selection;
   receiving a second selection indicative of a transform operation from the set of transform operations, wherein each transform operation of the set of transform operations is configured to perform a mathematical operation on a dataset that corresponds to the first grouped metric;
   receiving a third selection of a visualization template of the plurality of visualization templates, wherein the plurality of visualization templates is updated in response to receiving the first selection, the second selection, the third selection, or any combination thereof;
generating a time series report based on the first grouped metric, the transform operation, and the visualization template; and
displaying the time series report via the electronic display.

2. The system of claim 1, wherein the first set of group metrics corresponds to different types of data stored in the first table.

3. The system of claim 1, wherein the plurality of visualization templates is determined based on the type of data of the first table.

4. The system of claim 1, wherein the operations comprise:
receiving a request to create a hyperlink associated with the first selection, the second selection, the third selection, or any combination thereof, wherein the hyperlink is configured to recreate the time series report using one or more selections received prior to the first selection, the second selection, the third selection or any combination thereof that corresponds to the hyperlink.

5. The system of claim 1, comprising a time metric database configured to store the set of tables.

6. The system of claim 1, wherein the plurality of visualization templates comprises a line chart template, a stick chart template, a bar chart template, an area chart template, a spline chart template, or a time-step chart template, or any combination thereof.

7. The system of claim 1, wherein the operations comprise dynamically displaying a user interface element for receiving a parameter associated with the transform operation in response to receiving the second selection.

8. The system of claim 1, wherein the operations comprise dynamically displaying a second set of transform operations in response to receiving the second selection.

9. The system of claim 1, wherein the set of transform operations comprises average, minimize, maximize, count, sum, log, median, standard deviation, envelope, top, bottom, add, subtract, multiply, divide, interpolate, percentiles, resample, filter, partition, or any combination thereof.

10. A non-transitory computer-readable medium, comprising computer-executable instructions that, when executed by one or more processors, cause the one or more processors to perform operations comprising:
determining a first set of grouped metrics associated with a first table of a set of tables, wherein the first table of the set of tables comprises a set of grouped metrics, and wherein the set of grouped metrics is associated with a plurality of time series datasets;
displaying, via an electronic display, a plurality of visualization templates and a first input field for selecting one grouped metric of the first set of grouped metrics associated with the first table;
receiving, via the first input field, a first selection indicative of a first grouped metric of the first set of grouped metrics;
determining a set of transform operations for the first grouped metric in response to receiving the first selection;
receiving a second selection indicative of a transform operation from the set of transform operations, wherein each transform operation of the set of transform operations is configured to perform a mathematical operation on a dataset that corresponds to the first grouped metric;
receiving a third selection of a visualization template of the plurality of visualization templates, wherein the plurality of visualization templates is updated in response to receiving the first selection, the second selection, the third selection, or any combination thereof;
generating a time series report based on the first grouped metric, the transform operation, and the visualization template; and
displaying the time series report via the electronic display.

11. The non-transitory computer-readable medium of claim 10, comprising a relational database configured to store the set of tables.

12. The non-transitory computer-readable medium of claim 10, wherein the computer-executable instructions that, when executed by one or more processors, cause the one or more processors to perform operations comprising retrieving the set of tables from a data source, wherein the data source comprises a plurality of files.

13. The non-transitory computer-readable medium of claim 10, wherein the plurality of visualization templates is determined based on a type of data of the first table.

14. A method to dynamically configure a time series report, comprising:
determining, via a processor, a first set of grouped metrics associated with a first table of a set of tables, wherein the first table of the set of tables comprises a set of grouped metrics, and wherein the set of grouped metrics is associated with a plurality of time series datasets;
displaying, via an electronic display, a plurality of visualization templates and a first input field for selecting one grouped metric of the first set of grouped metrics associated with the first table;
receiving, via the first input field, a first selection indicative of a first grouped metric of the first set of grouped metrics;
determining, via the processor, a set of transform operations for the first grouped metric in response to receiving the first selection;
receiving, via the processor, a second selection indicative of a transform operation from the set of transform operations, wherein each transform operation of the set of transform operations is configured to perform a mathematical operation on a dataset that corresponds to the first grouped metric;
receiving, via the processor, a third selection of a visualization template of the plurality of visualization templates, wherein the plurality of visualization templates is updated in response to receiving the first selection, the second selection, the third selection, or any combination thereof;
generating, via the processor, the time series report based on the first grouped metric, the transform operation, and the visualization template; and
displaying, via the processor, the time series report via the electronic display.

15. The method of claim 14, wherein the method comprises:
receiving a request to create a hyperlink associated with the first selection, the second selection, the third selection, or any combination thereof, wherein the hyperlink is configured to recreate the time series report using one or more selections received prior to the first selection, the second selection, the third selection, or any combination thereof that corresponds to the hyperlink.

16. The method of claim 14, comprising a time metric database configured to store the set of tables.

17. The method of claim 14, wherein the plurality of visualization templates is determined based on a type of data of the first table.

18. The method of claim 14, wherein the plurality of visualization templates comprises a line chart template, a stick chart template, a bar chart template, an area chart template, a spline chart template, or a time-step chart template, or any combination thereof.

19. The method of claim 14, comprising:
   determining, via the processor, a second set of grouped metrics associated with the first table;
   receiving, via the processor, a fourth selection of a second grouped metric of the second set of grouped metrics; and
   generating, via the processor, the time series report based on the first grouped metric and the second grouped metric.

20. The method of claim 14, comprising:
   receiving a change to the first selection, the second selection, the third selection, or any combination thereof, and
   dynamically updating the time series report in response to receiving the change.

\* \* \* \* \*